United States Patent
Larson et al.

(10) Patent No.: US 7,383,256 B2
(45) Date of Patent: *Jun. 3, 2008

(54) SYSTEM AND METHOD FOR OPTIMIZING QUERIES USING MATERIALIZED VIEWS AND FAST VIEW MATCHING

(75) Inventors: Per-Ake Larson, Redmond, WA (US); Jonathan Goldstein, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

This patent is subject to a terminal disclaimer.

(21) Appl. No.: 10/977,707

(22) Filed: Oct. 29, 2004

(65) Prior Publication Data

US 2005/0091208 A1    Apr. 28, 2005

Related U.S. Application Data (63) Continuation of application No. 10/000,989, filed on Nov. 15, 2001, now Pat. No. 6,850,933.

(51) Int. Cl.
    *G06F 17/30* (2006.01)
(52) U.S. Cl. ................... 707/4; 707/2; 707/102
(58) Field of Classification Search ............ 707/2, 707/4
    See application file for complete search history.

(56) References Cited

U.S. PATENT DOCUMENTS

| | | | | |
|---|---|---|---|---|
| 5,544,355 A | * | 8/1996 | Chaudhuri et al. | 707/2 |
| 5,551,031 A | * | 8/1996 | M. Cheng et al. | 707/2 |
| 5,897,632 A | * | 4/1999 | Dar et al. | 707/2 |
| 6,026,390 A | * | 2/2000 | Ross et al. | 707/2 |
| 6,094,654 A | * | 7/2000 | Van Huben et al. | 707/8 |
| 6,199,063 B1 | * | 3/2001 | Colby et al. | 707/4 |
| 6,345,272 B1 | * | 2/2002 | Witkowski et al. | 707/4 |
| 6,356,889 B1 | * | 3/2002 | Lohman et al. | 707/2 |
| 6,374,241 B1 | * | 4/2002 | Lamburt et al. | 707/6 |
| 6,460,027 B1 | * | 10/2002 | Cochrane et al. | 707/2 |
| 6,601,021 B2 | * | 7/2003 | Card et al. | 702/187 |
| 2001/0000356 A1 | * | 4/2001 | Woods | 707/3 |
| 2002/0138460 A1 | * | 9/2002 | Cochrane et al. | 707/1 |

* cited by examiner

*Primary Examiner*—Syling Yen
(74) *Attorney, Agent, or Firm*—Woodcock Washburn LLP (57) ABSTRACT

A transformation-based optimizer generates rewritings by applying local algebraic transformation rules on subexpressions of a query. Application of a transformation rule produces substitute expressions, logically equivalent to the original expression. View matching, that is, computing a subexpression from materialized views, is one such transformation rule. The view matching rule applies a view matching technique that determines whether the original query can be computed from one or more of the existing materialized views and, if so, generates substitute expressions. An index structure of materialized views is provided that quickly narrows the search to a set of candidate views on which the view matching techniques can be applied. The index structure, also called a filter tree, speeds up the search for applicable materialized views.

26 Claims, 6 Drawing Sheets

SYSTEM AND METHOD FOR OPTIMIZING QUERIES USING MATERIALIZED VIEWS AND FAST VIEW MATCHING

CROSS-REFERENCE TO RELATED CASES

This application is a continuation of U.S. patent application Ser. No. 10/000,989 filed Nov. 15, 2001 now U.S. Pat. No. 6,850,933, entitled "System And Method For Optimizing Queries Using Materialized Views And Fast View Matching" which is herein incorporated by reference in its entirety.

FIELD OF THE INVENTION

This invention relates in general to database management systems performed by computers. More particularly, this invention relates to query optimization using materialized views.

BACKGROUND OF THE INVENTION

A materialized view is a precomputed result that may be used to compute part or all of query instead of computing it from base tables. The use of materialized views to speed up query processing is conventionally known. In the last few years, materialized views have been implemented in commercial database systems. An implementation of materialized views must solve the view matching problem, that is, determining whether a relational expression can be computed from a set of materialized views and, if so, how. Techniques proposed in the literature for solving the view matching problem differ in several respects: (1) class of query expressions considered; (2) class of views supported; (3) class of substitute expressions considered; (4) whether and how multiple substitute expressions are handled; (5) whether bag semantics or set semantics is assumed; and (6) which constraints, if any, are exploited.

A large database may contain hundreds, even thousands, of tables and hundreds of materialized views. A smart system might also cache and reuse results of previously computed queries. Cached results can be treated as temporary materialized views, easily resulting in thousands of materialized views. Current techniques to determine whether and how a subexpression of a query can be computed from a collection of materialized views run very slowly, especially when the number of views is large.

In view of the foregoing, there is a need for systems and methods that overcome the limitations and drawbacks of the prior art.

SUMMARY OF THE INVENTION

The present invention is directed to systems and methods that make use of materialized views to speed up query processing. More specifically, it deals with materialized view exploitation in query optimizers of relational database systems. A query optimizer can be viewed as generating equivalent rewritings of a query expression, estimating their cost, and choosing the one with the lowest cost. A transformation-based optimizer generates rewritings by applying local algebraic transformation rules on subexpressions of the query. Application of a transformation rule produces substitute expressions that are logically equivalent to the original expression. View matching, that is, computing a subexpression from materialized views, is one such transformation rule. The view matching rule (or rules) invokes a view matching procedure that determines whether the original query can be computed from one or more of the existing materialized views and, if so, generates substitute expressions. The view matching rule may be invoked many times during optimization, each time on a different subexpression.

According to aspects of the invention, an efficient view matching method is provided for views composed of selections, joins and an optional group by, here referred to as SPJ+G views. An index structure, called a filter tree, is provided that speeds up the search for applicable materialized views. The filter tree quickly narrows the search to a small set of candidate views on which detailed view matching techniques can be applied.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to systems and methods that use materialized views in query processing to reduce query processing time, e.g., for aggregation queries over large tables. A fast and scalable method is provided that determines whether part or all of a query can be computed from materialized views and describes how it can be incorporated in a transformation-based optimizer. An embodiment handles views composed of selections, joins and a final group by and the invention can be extended to a broader class of views.

A view matching procedure receives as input a subexpression of a query and determines whether and how that expression can be computed from the available materialized views. The procedure is preferably fast, because it may be invoked many times during query optimization, and scalable, because there may be many materialized views.

In Microsoft SQL Server, for example, materialized views are called indexed views because a view may be not only materialized but also indexed in multiple ways. A view is materialized by creating a unique clustered index on an existing view. Once the clustered index has been created, additional secondary indexes can be created on the view. An exemplary indexable view is defined by a single-level statement (e.g., a SQL statement) containing selections, (inner) joins, and an optional group by.

A transformation-based optimizer generates rewrites by recursively applying transformation rules on relational expressions. View matching is a transformation rule that is invoked on every applicable subexpression, in the current embodiment, on every select-project-join-group-by (SPJ+G) expression, for example. For each expression, the view matching procedure determines from which materialized views, if any, the given expression can be computed. For each such materialized view, it then constructs a substitute expression that is guaranteed to produce the same results as the original expression. It is preferable that a substitute expression is computed from the view alone. Thus, for a relational expression in SPJ+G form, preferably all materialized views from which the expression can be computed are determined and, for each view found, a substitute expression is generated that is equivalent to the given expression.

Computing Environment

Figure 1:
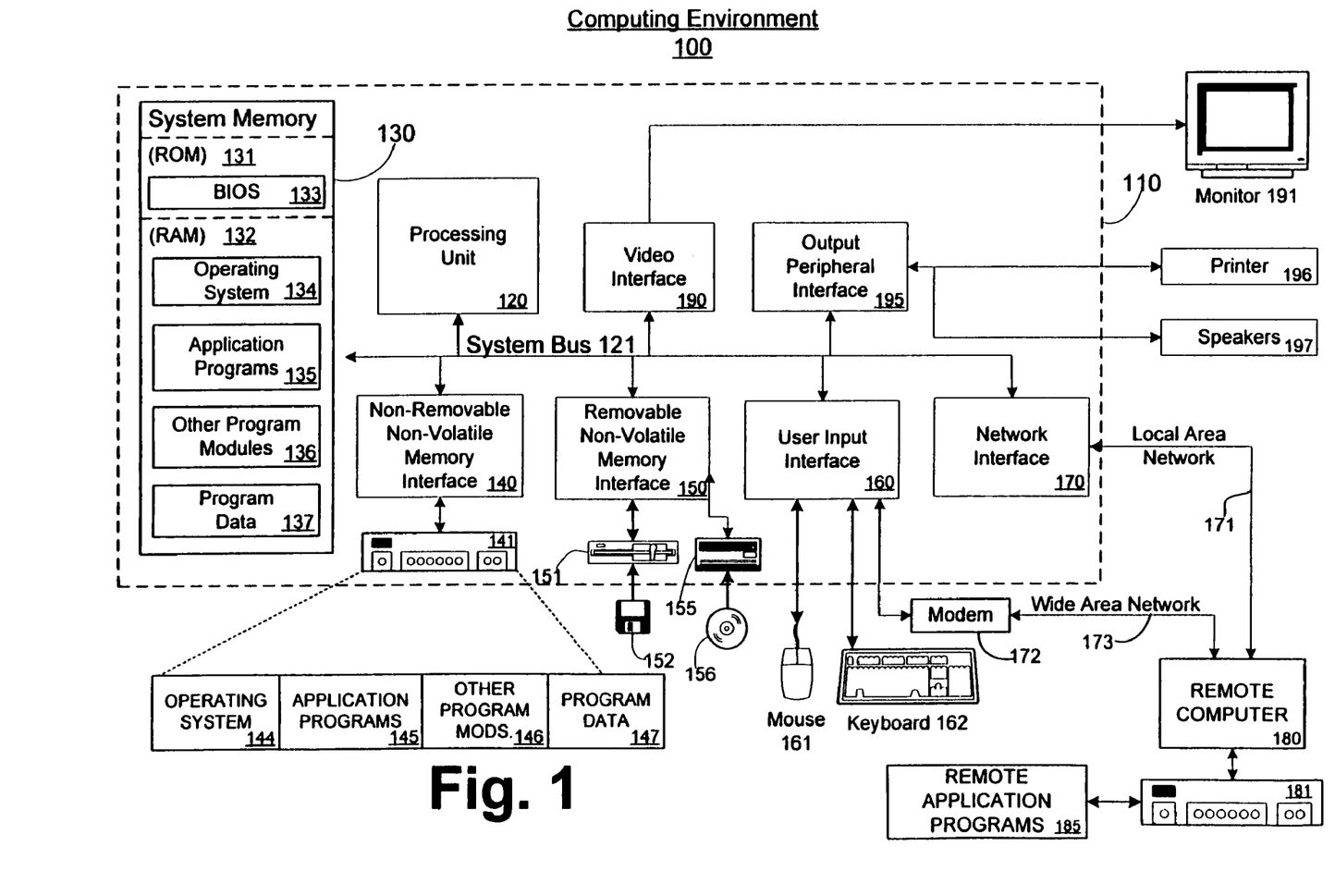
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 -and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Query Optimizing

Systems and methods are described herein that determine whether a query expression can be computed from a view and, if it can, how to construct a substitute expression. A fast, efficient technique is provided to determine whether a materialized view can be used (this is referred to as "view matching"). The technique will first be described for the case when the view and the query are limited to SPJ expressions referencing exactly the same tables. Views containing extra tables and views and queries with aggregation are then described. Views with fewer tables than the query expression need not be explicitly considered. Such views can be used to compute a subexpression of the given expression and the view matching rule will automatically be invoked on every such subexpression.

The present invention is capable of exploiting four types of constraints: not-null constraints on columns, primary key constraints, uniqueness constraints, and foreign key constraints. The selection predicates of view and query expressions are first converted to conjunctive normal form (CNF), if desired.

Figure 2:
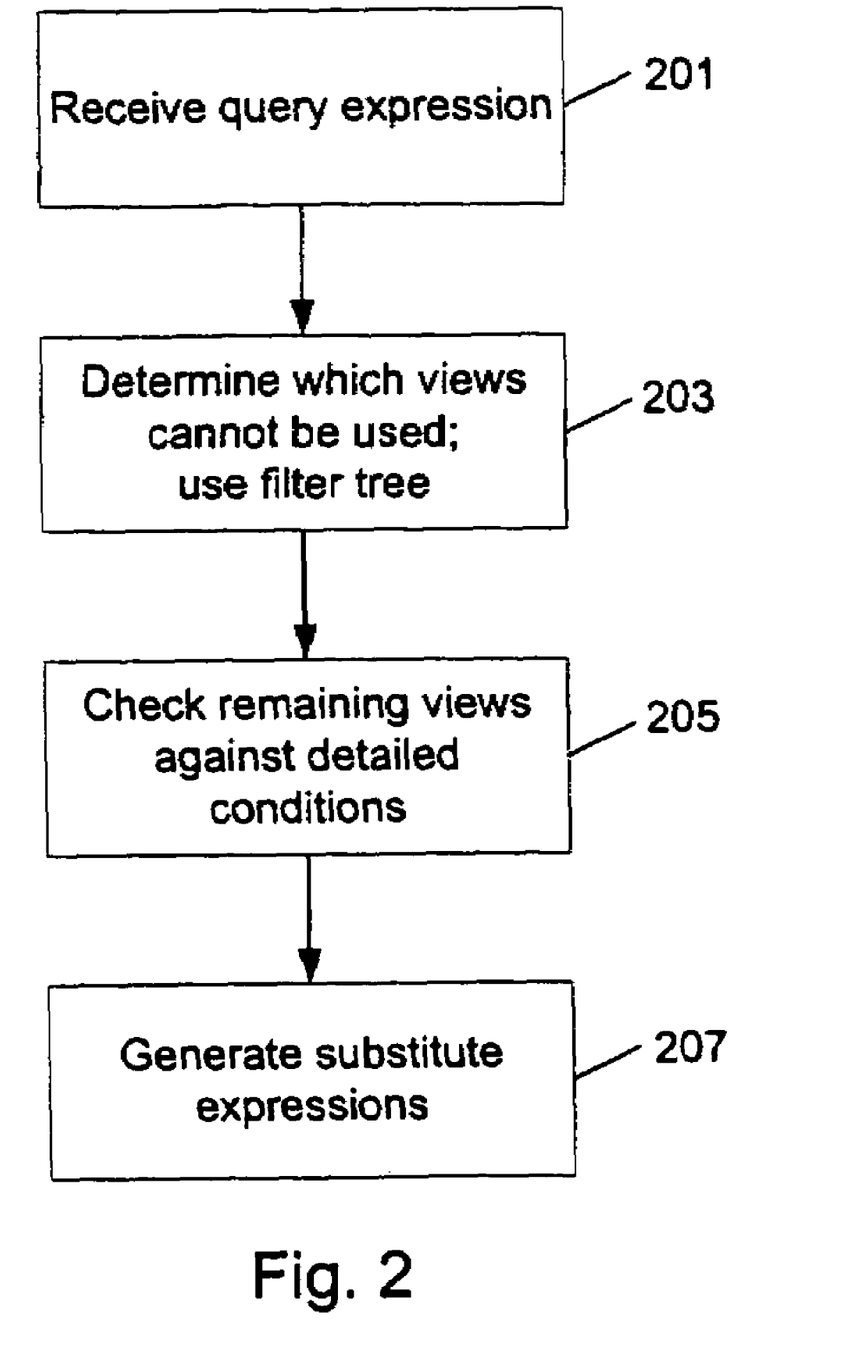
FIG. 2 is a flow diagram of an exemplary query optimizing method in accordance with the present invention.

FIG. 2 is a high level flow diagram of the view matching procedure in accordance with the present invention. At step 201, a query expression is received. When a new query expression is received, it is determined which of the pre-computed materialized views can be used. More particularly, at step 203, it is determined which of the existing materialized views cannot be used, and these views are dismissed from further consideration. The remaining views are called candidate views. An index structure, described in further detail below, is helpful in determining candidate views. The materialized views have been previously generated and stored by, for example, a database administrator.

At step 205, the remaining candidate materialized views are checked against detailed conditions. Although several detailed checking methods can be used, a preferred technique is described herein. At step 207, substitute expressions for each qualifying view are constructed. The substitute expressions may be used subsequently in processing the query. All of the substitute expressions are then sent to a costing engine, which determines which view(s), if any, to use. Thus, the optimizer takes a query, performs transformations, and uses the most efficient (least costly) one.

It should be noted that step 203 can be omitted, but this would result in a slower process. Further details for each of the steps are given below.

Detailed Checking

The detailed checking now described relates to step 205 in FIG. 2. For a SPJ query expression to be computable from a view alone, the view must satisfy the following four conditions. (1) The view contains all rows needed by the query expression. This is required when only single-view substitutes are being considered. (2) All required rows can be selected from the view. Even if all required rows exist in the view, they may not be able to be extracted correctly. Selection is performed by applying a compensating predicate. If one of the columns required by the predicate is missing from the view output, the required rows cannot be selected. (3) All output expressions can be computed from the output of the view. (4) All output rows occur with the correct duplication factor; i.e., any duplicate rows occur the same number of times as in the result of the query expression.

(1) Checking that the View Contains all Rows Needed by the Query Expression

Figure 3:
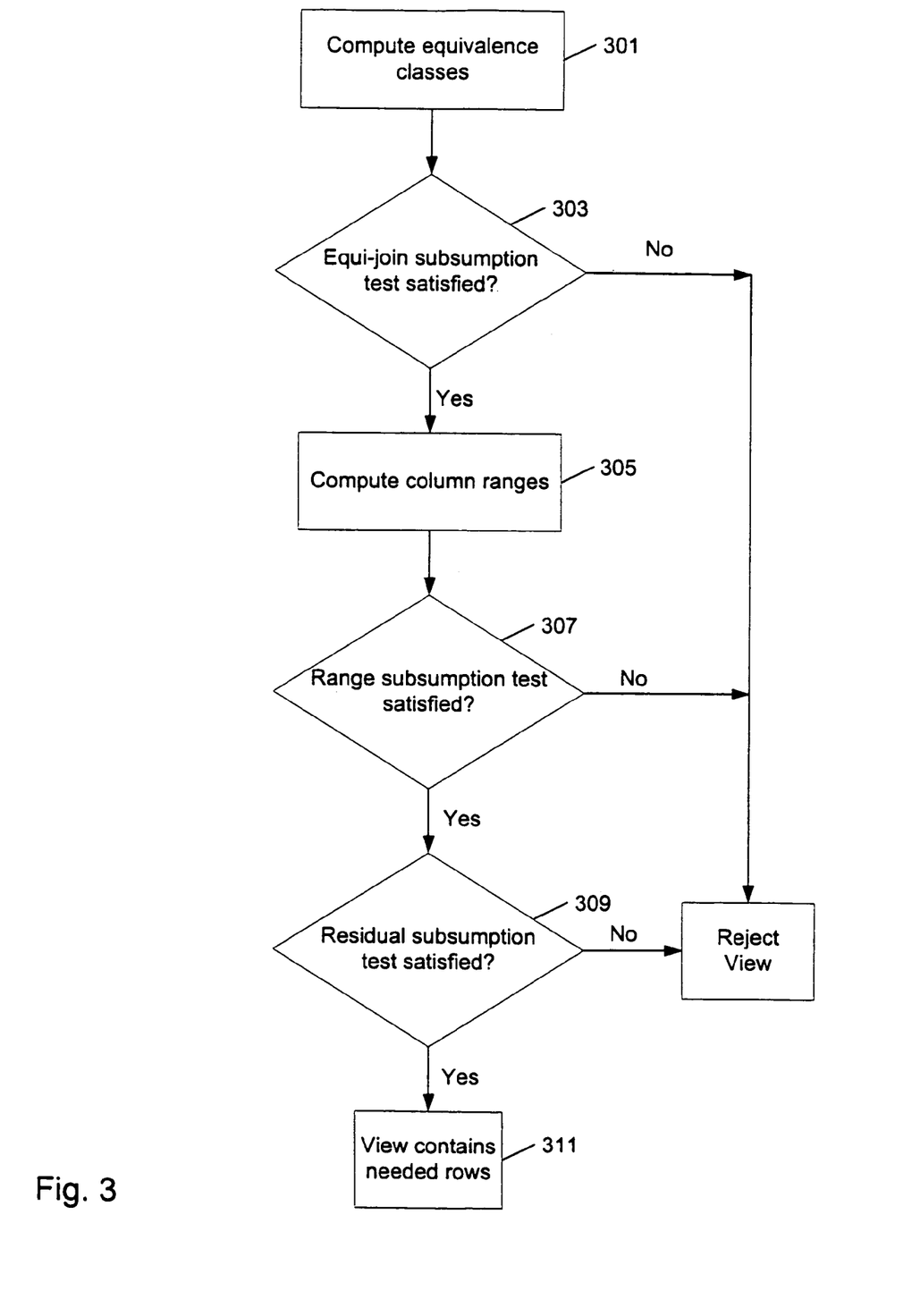
FIG. 3 is a flow diagram of an exemplary method of determining whether a view contains the rows needed by the query in accordance with the present invention.

To determine whether a view contains all the desired rows, it must be shown that the view result is a superset of the query result. This holds if the selection predicate of the query subsumes (implies) the selection predicate of the view, which guarantees that every row satisfying the query predicate also satisfies the view predicate. There are several options for testing predicate subsumption. The preferred implementation explained herein divides the subsumption test into three tests: an equijoin subsumption test, a range subsumption, test and a residual subsumption test. FIG. 3 shows a flow diagram of an exemplary method of determining whether a view contains the rows needed by the query in accordance with the present invention In the preferred implementation described herein, all three tests exploit knowledge about column equivalences in PSJ expressions. The information can be captured compactly by computing a collection of equivalence classes from column equality predicates contained in the selection predicate. A column equality predicate is any atomic predicate of the form $(T_i.C_p=T_j.C_q)$, where $T_i.C_p$ and $T_j.C_q$ are column references. An equivalence class is a set of columns that are known to be equal and hence can be used interchangeably in other predicates or scalar expressions. To compute the equivalence classes, begin with each column of the tables referenced by the expression in a separate set. Then loop through the column equality predicates in any order. If the two columns referenced by the equality predicate are in different sets, the two sets are merged; otherwise, nothing is done. The sets left at the end are the desired collection of equivalence classes, including trivial classes comprising a single column. Equivalence classes are computed in step 301.

In step 303 the equijoin subsumption test is performed, in which column equivalence classes for the query and the view are compared. The test amounts to requiring that all columns equal in the view must also be equal in the query (but not vice versa). This test comprises checking whether every non-trivial view equivalence class is a subset of some query equivalence class. Suppose the view contains (A=B and B=C) and the query contains (A=C and C=B). Even though the actual predicates do not match, they are logically equivalent because they both imply that A=B=C. The effect of transitivity is correctly captured by using equivalence classes. If the view passes the equijoin subsumption test, it does not contain any conflicting column equality constraints.

During this process, compensating equality predicates that must be enforced on the view can also be determined. If two different equivalence classes in the query contain columns from the same equivalence class in the view, a compensating equality predicate containing one column from each view equivalence class is created.

In step 305, range intervals for every column equivalence class are computed in preparation for the range subsumption test. When no ORs are involved, a range specifies a lower and upper bound on the columns in the equivalence class. Ranges are computed from range predicates, which are atomic predicates of the form $(T_i.C_p$ op c), where $T_i.C_p$ is a column reference, op is a comparison operator and c is a constant. The range predicates are considered one by one, the equivalence class containing the column referenced is found, and its range is set or adjusted accordingly. If the predicate is of type $(T_i.C_p<=c)$, the upper bound is set to the minimum of its current value and c. If it is of type $(T_iC_p>=c)$, the upper bound is set to the maximum of its current value and c. Predicates of the form $(T_i.C_p<c)$ are treated as $(T_i.C_p<=c-\Delta)$ where $c-\Delta$ denotes the smallest value preceding c in the domain of column $T_i.C_p$. Predicates of the form $(T_i.C_p>c)$ are treated as $(T_i.C_p<=c+\Delta)$. Finally, predicates of the form $(T_i.C_p=c)$ are treated as $(T_i.C_p>=c)^{\wedge}(T_i.C_p<=c)$. The same process is repeated for the view.

The range subsumption test is performed in step 307. The view cannot contain all desired rows if it is more tightly constrained than the query. To check whether this is the case, the view equivalence classes with non-trivial ranges are considered, that is, ranges where at least one of the bounds has been set. The matching equivalence class in the query is found, that is, the query equivalence class that has at least one column in common with the query equivalence class. Finally, the range of the query equivalence class is checked to determine if it is contained in the range of the view equivalence class. (Uninitialized bounds are treated as $+\infty$ or $-\infty$.) If it is not, the range subsumption test fails and the view is rejected. The, range subsumption test can be extended to support disjunctions (OR) of range predicates.

During this process, the compensating range predicates are determined that are to be applied to the view to produce the query result. If a query range matches the corresponding view range, no further restriction is needed. If the lower bound does not match, the view result is restricted by enforcing the predicate (T.C>=lb) where T.C is a column in the (query) equivalence class and lb is the lower bound of the query range. If the upper bounds differ, the predicate (T.C<=ub) is enforced, where ub is the upper bound of the query range.

In step 309, the residual subsumption test is performed. Conjuncts that are neither column-equality predicates nor range predicates form the residual predicates of the query and the view. The reasoning applied to these predicates is column equality as captured by the equivalence classes of the query. The implication is tested by checking whether every conjunct in the view residual predicate matches a conjunct in the query residual predicate. Two column references are considered to match if they belong to the same (query) equivalence class. If the match fails, the view is rejected because the view contains a predicate not present in the query. Any residual predicate in the query that did not match anything in the view is applied to the view.

Whether two conjuncts are found to match depends on the matching algorithm. A shallow matching algorithm is preferably used: except for column equivalences, the expressions are desirably identical. An expression is represented by a text string and a list of column references. The text string contains the textual version of the expression with column references omitted. The list contains every column reference in the expression, in the order they would occur in the textual version of the expression. To compare two expressions, the strings are compared. If they are equal, the two lists are scanned through, comparing column references in the same positions of the two lists. If both column references are contained in the same (query) equivalence class, the column references match; otherwise, the column references do not match. If all column pairs match, the expressions match, at step 311.

The process is illustrated using the example view and query below.

View: Create view V2 with schemabinding as
  Select l_orderkey, o_custkey, l_partkey, l_shipdate, o_orderdate,
  l_quantity*l_extendedprice as gross_revenue
  From dbo.lineitem, dbo.orders, dbo.part
  Where l_orderkey=o_orderkey
  And l_partkey=p_partkey
  And p_partkey>=150
  And o_custkey>=50 and o_custkey<=500
  And p_name like '% abc %'
Query: Select l_orderkey, o_custkey, l_partkey, l_quantity*l_extendedprice
  From lineitem, orders, part Where 1_orderkey=o_orderkey
And 1_partkey=p_partkey
And 1_partkey>=150 and 1_partkey<=160
And o_custkey=123
And o_orderdate=1_shipdate
And p_name like '% abc %'
And 1_quantity*1_extendedprice>100.00

Step 301: Compute Equivalence Classes.
View equivalence classes: {1_orderkey, o_orderkey}, {1_partkey, p_partkey}, {o_orderdate}, {1_shipdate}
Query equivalence classes: {1_orderkey, o_orderkey}, {1_partkey, pdpartkey}, {o_orderdate, 1_shipdate}

Not all trivial equivalence classes are shown; {o_orderdate} and {1_shipdate} are included because they are used later in the example.

Step 303: Check View Equivalence Class Containment.

The two non-trivial view equivalence classes both have exact matches among the query equivalence classes. The (trivial) equivalence classes {o_orderdate} and {1_shipdate} map to the same query equivalence class, which means that the substitute expression adds the compensating predicate (o_orderdate=1_shipdate).

Step 305: Compute Ranges.
View ranges: {1_partkey, p_partkey} ∈ (150, +∞), {o_custkey} ∈ (50, 500)
Query ranges: {1_partkey, p_partkey} ∈ (150, 160), {o_custkey} ∈ (123, 123)

Step 307: Check Query Range Containment.
The range (150, 160) on {1_partkey, p_partkey} is contained in the corresponding view range. The upper bounds do not match so the predicate ({1_partkey, p_partkey}<=160) is must be enforced in the substitute. The range (123, 123) on {o_custkey} is also contained in the corresponding view range. The bounds do not match so the predicates (o_custkey>=123) and (o_custkey<=123) must be enforced, which can be simplified to (o_custkey=123).

Step 309: Check Match of View Residual Predicates.
View residual predicate: p_name like '% abc %'
Query residual predicate: p_name like '% abc %', 1_quantity*1_extendedprice>100.00

The view has only one residual predicate, p_name like '% abc %', which also exists in the query. The extra residual predicate, 1_quantity*1_extendedprice>100.00 must be enforced. The view passes all the tests so it is concluded that it contains all the required rows.

(2) Checking whether All Required Rows can be Selected from the View

If the view contains rows that are not needed by the query, compensating predicates must be enforced on the view to reduce it to the correct set of rows. Compensating predicates are of three different types:

1. Column equality predicates obtained while comparing view and query equivalence classes. In the example above, there was one predicate of this type, namely, (o_orderdate=1_shipdate).
2. Range predicates obtained while checking query ranges against view ranges. In the example, there were two predicates of this type, namely, ({p_partkey, 1_partkey}<=160) and (o_custkey=123).
3. Unmatched residual predicates from the query. There was one predicate of this type, namely, (1_quantity*1_extendedprice>100.00).

All compensating predicates must be computable from the view's output. Equalities among columns are exploited by considering each column reference to refer to the equivalence class containing the column, instead of referencing the column itself. The query equivalence classes are desirably used in all but one case, namely, the compensating column equality predicates. These predicates are used to enforce additional column equalities used by the query. Each predicate merges two view equivalence classes and, collectively, they make the view equivalence classes equal to the query equivalence classes. Hence, a column reference can be redirected to any column within its view equivalence class but not within its query equivalence class.

Compensating predicates of type 1 and type 2 above contain only simple column references. All that is needed is to check whether at least one of the columns in the referenced equivalence class is an output column of the view and then route the reference to that column. Compensating predicates of type 3 may involve more complex expressions. In that case, it may be possible to evaluate the expression even though some of the columns referenced cannot be mapped to an output column of the view. For example, if 1_quantity*1_extendedprice is available as a view output column, the predicate (1_quantity*1_extendedprice>100) can be evaluated without the columns 1_quantity and 1_extendedprice.

Figure 4:
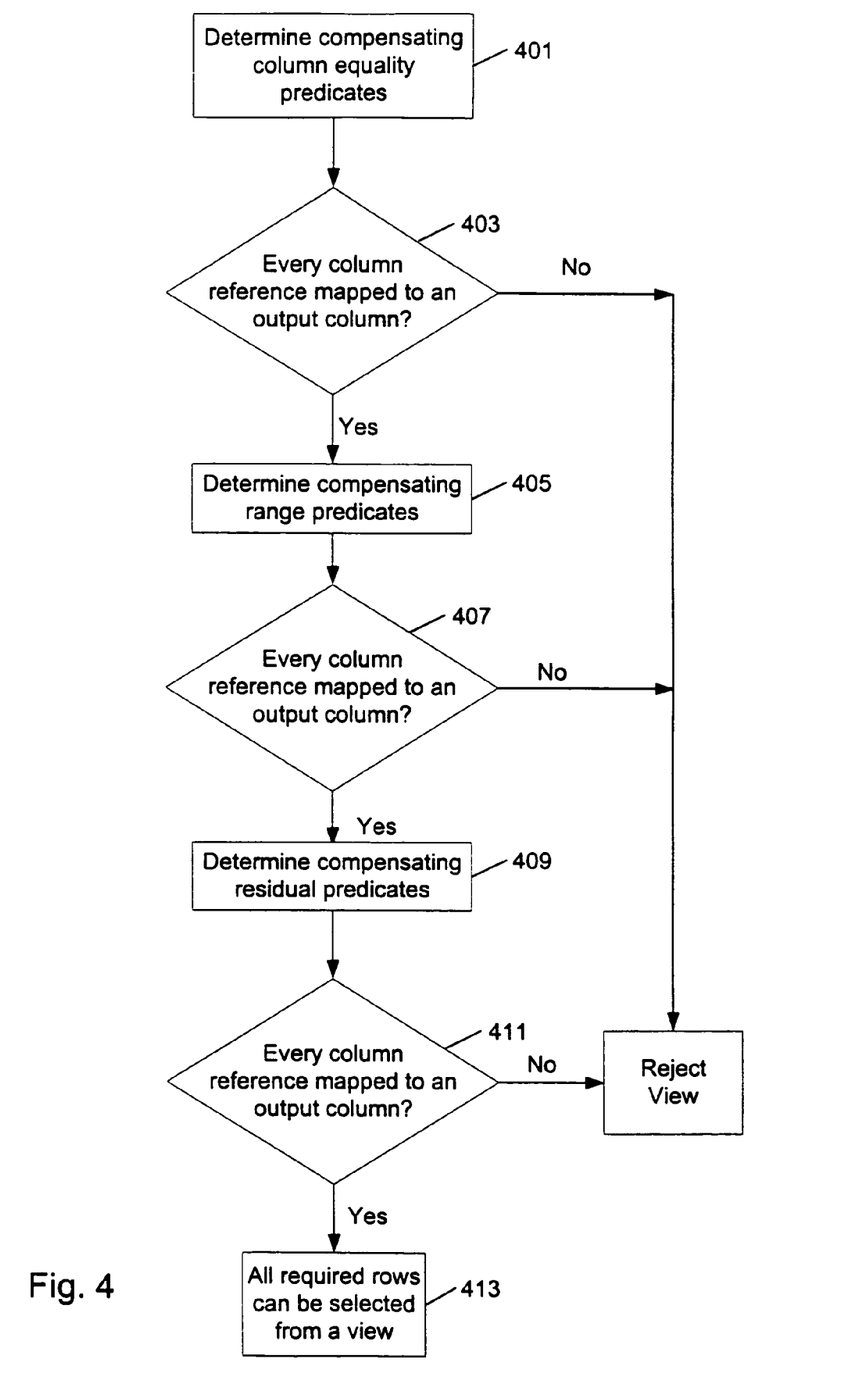
FIG. 4 is a flow diagram of an exemplary method of determining whether the rows required by the query can be selected from a view in accordance with the present invention.

FIG. 4 is a flow diagram of an exemplary method of determining whether all rows required by the query can be selected from a view in accordance with the present invention. At step 401, compensating column equality predicates are constructed. This can be done separately or in combination with the equijoin subsumption test (step 303 in FIG. 3). At step 403, it is determined whether every column reference can be mapped to an output column (using the view equivalence classes). In other words, all column references must map to an output column in the view, taking into account column equivalences. If not, the view is rejected.

At step 405, compensating range predicates are constructed while comparing column ranges during the range subsumption test (step 307 in FIG. 3). At step 407, it is determined whether every column reference can be mapped to an output column (using the query equivalence classes). If not, the view is rejected.

At step 409, the residual predicates of the query that are missing in the view are determined. Any such missing predicate becomes a compensating residual predicate. At step 411, it is determined whether every column reference can be mapped to an output column (using the query equivalence classes). If so, then it is determined at step 413 that all rows required by the query can be selected from a view. Otherwise, the view is rejected.

Continuing with the example set forth above, the compensating predicates that are applied to the view are (o_orderdate=1_shipdate), ({p_partkey, 1_partkey}<=160), (o_custkey=123), and (1_quantity*1_extendedprice>100.00). The notation {p_partkey, 1_partkey} in the second predicates means that either p_partkey or 1_partkey can be chosen.

Figure 5:
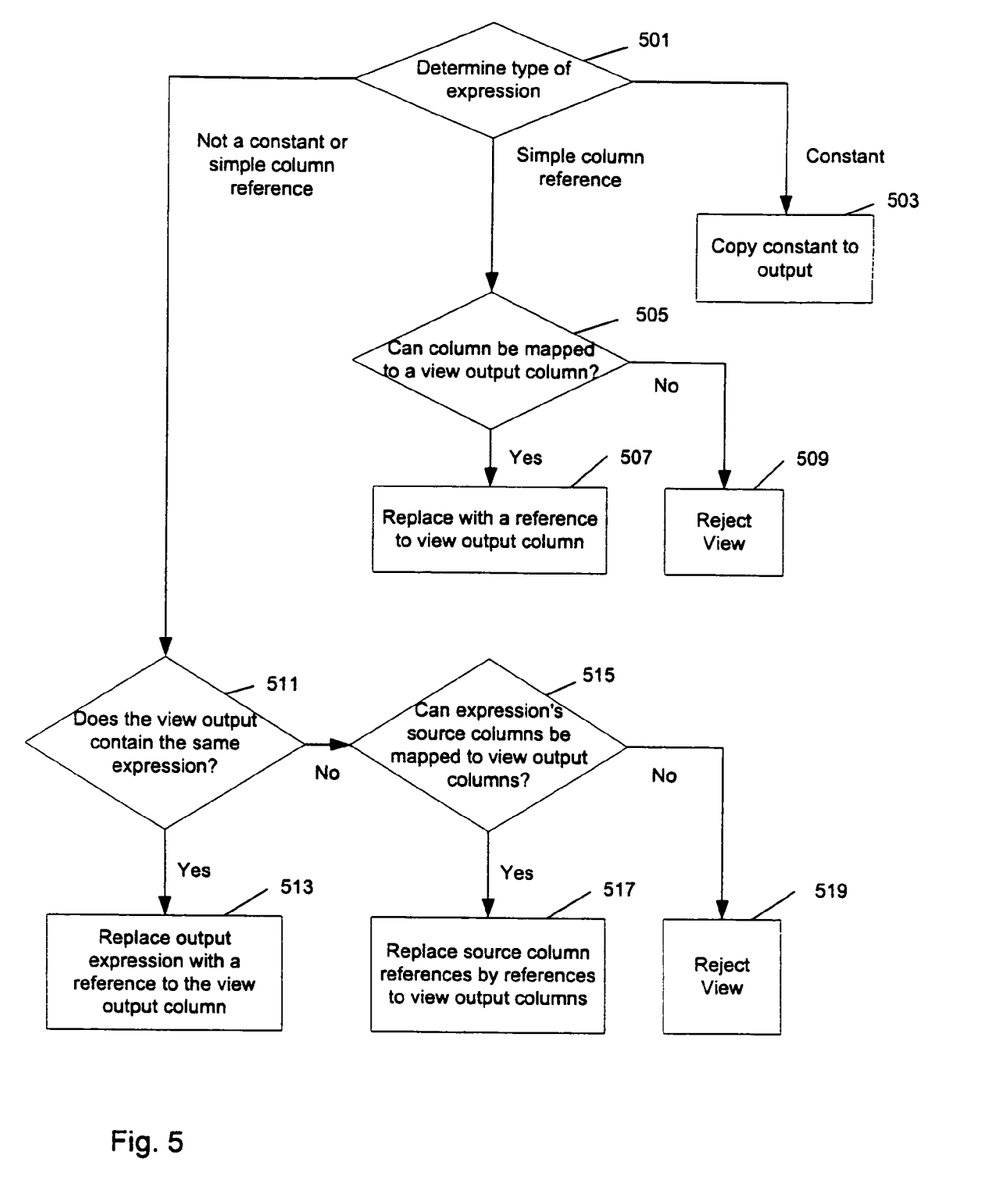
FIG. 5 is a flow diagram of an exemplary method of determining whether the output expressions can be computed from the output of a view in accordance with the present invention.

(3) Checking whether All Output Expressions Can be Computed from the Output of the View FIG. 5 is a flow diagram of an exemplary method of determining whether an output expression can be computed from the output of a view in accordance with the present invention. If one or more of the query's output expressions fail this test, the view is rejected.

Checking whether all output expressions of the query can be computed from the view is similar to checking whether the additional predicates can be computed correctly. At step 501, the type of the expression is determined. If the output expression is a constant, the constant is copied to the output, at step 503. If the output expression is a simple column reference, it is determined whether it can be mapped (using the query equivalence classes) to an output column of the view, at step 505. If it can be mapped, the column reference is replaced by a reference to the matching output column of the view, at step 507. If it cannot, the view is rejected, at step 509.

For other expressions, at step 511, it is determined whether the view output contains exactly the same expression (taking into account column equivalences). If so, the output expression is replaced by a reference to the matching view output column at step 513. If not, it is determined whether the expression's source columns can all be mapped to view output columns, i.e., whether the complete expression can be computed from (simple) output columns, at step 515. If they can all be mapped, the column references of the expression are replaced by references to the matching output columns of the view, at step 517. If the view fails the tests at steps 511 and 515, the view is rejected at step 519.

(4) Checking whether Output Rows Occur with the Correct Duplication Factor

When the query and the view reference exactly the same tables, this condition is automatically satisfied if the view passes the previous tests so no further testing is required.

Extra Tables in the View

It may be possible to compute a query from a view even if the view contains extra tables, that is, tables not referenced by the query. This case is now described.

Consider a SPJ query that references tables $T_1, T_2, \ldots, T_n$ and a view that references one additional table, that is, tables $T_1, T_2, \ldots, T_n$, S. To determine the circumstances under which the query can be computed from the view, the notion of cardinality-preserving joins (also referred to as table extension joins) is used. A join between tables T and S is cardinality preserving if every row in T joins with exactly one row in S. If so, S can be viewed as simply extending T with the columns from S. An equijoin between all columns of a non-null foreign key in T and a unique key in S has this property. A foreign key constraint guarantees that, for every row t of T, there exists at least one row s in S with matching column values for all non-null foreign-key columns in t. All columns in t containing a null are ignored when validating the foreign-key constraint. A uniqueness constraint on the join columns of S guarantees that there is exactly one matching row.

If the view references multiple extra tables, suppose the query references tables $T_1, T_2, \ldots, T_n$ and the view references m extra tables, that is, it references tables $T_1, T_2, \ldots, T_n, T_{n+1}, T_{n+2}, \ldots, T_{n+m}$. To determine whether tables $T_{n+1}, T_{n+2}, \ldots, T_{n+m}$ are joined to tables $T_1, T_2, \ldots, T_n$ through a series of cardinality preserving joins, a directed graph is built, called a foreign-key join graph. The nodes in the graph represent tables $T_1, T_2, \ldots, T_n, T_{n+1}, T_{n+2}, \ldots, T_{n+m}$. There is an edge from table $T_i$ to table $T_j$ if the view specifies, directly or transitively, a join between tables $T_i$ and $T_j$ and the join satisfies the equijoin, the all columns, the non-null, the foreign key, and the unique key properties. To capture transitive equijoin conditions correctly, use the equivalence classes when adding edges to the graph. In the case in which it is considered whether to add an edge from table $T_i$ to table $T_j$ and there is an acceptable foreign key constraint going from columns $F_1, F_2, \ldots, F_n$ of table $T_i$ to columns $C_1, C_2, \ldots, C_n$ of $T_j$, for each column $C_i$, the column's equivalence class is located and it is checked whether the corresponding foreign key column $F_i$ is part of the same equivalence class. If the join columns pass this test, the edge is added.

Once the graph has been built, the nodes $T_{n+1}, T_{n+2}, \ldots, T_{n+m}$ are attempted to be eliminated by a sequence of deletions. Repeatedly delete any node that has no outgoing edges and exactly one incoming edge. (Logically, this corresponds to performing the join represented by the incoming edge.) When a node $T_i$ is deleted, its incoming edge is also deleted which may make another node deletable. This process continues until no more nodes can be deleted or the nodes $T_{n+1}, T_{n+2}, \ldots, T_{n+m}$ have been eliminated. If nodes $T_{n+1}, T_{n+2}, \ldots, T_{n+m}$ are eliminated, the extra tables in the view can be eliminated through cardinality-preserving joins and the view passes this test.

The view must still pass the subsumption tests described above. However, these tests assume that the query and the view reference the same tables. To make them the same, the extra tables $T_{n+1}, T_{n+2}, \ldots, T_{n+m}$ are logically added to the query and joined to the existing tables $T_1, T_2, \ldots, T_n$ through the same foreign-key joins that were used to eliminate them from the view. Because the joins are all cardinality preserving, this will not change the result of the query.

The procedure above ensures that each extra table in the view can be prejoined, directly or indirectly, to some input table T of the query and the resulting, wider table will contain exactly the same rows as the original query. Once the query has been augmented with the extra tables in this way, the tests described in the previous section can be applied unchanged.

Aggregation Queries and Views

Aggregation queries and views are now considered. Aggregation queries are treated as consisting of a SPJ query followed by a group-by operation, and views are treated similarly. An aggregation query can be computed from a view if the view satisfies the following requirements: (1) The SPJ part of the view produces all rows needed by the SPJ part of the query along with the right duplication factor. (2) All columns used by compensating predicates (if any) are available in the view output. (3) The view contains no aggregation or is less aggregated than the query, that is, the groups formed by the query can be computed by further aggregating groups output by the view. (4) All columns used to perform further grouping (if necessary) are available in the view output. (5) All columns used by output expressions are available in the view output.

The first two requirements are the same as for SPJ queries. The third requirement is satisfied if the group-by list of the query is a subset of the group-by list of the view or the view contains no aggregation That is, if the view is grouped on expressions A, B, C then the query can be grouped on any subset of A, B, C. This includes the empty set, which corresponds to an aggregation query without a group by clause. It is sufficient that the grouping expressions of the view functionally determine the grouping expressions of the query.

If the query group-by list is equal to the view group-by list, no further aggregation is needed so the fourth requirement is automatically satisfied. If it is a strict subset, then a compensating group-by is added on top of the view. The grouping expressions are the same as for the query. Because they are a subset of the view grouping expressions and all grouping expressions of the view must be part of the view output, they are always available in the view output. Hence, the fourth requirement is satisfied. Testing whether the fifth requirement is satisfied is similar to what was described for SPJ queries.

Fast Filtering of Views

Descriptions of materialized views are extracted and stored in main memory. It is very expensive to check all the views each time view matching is attempted, so preferably an index is used on the view descriptions to speed up the filtering of views. The preferred implementation of such an index is now described. The index recursively partitions the set of views into smaller and smaller subsets based on certain conditions. Examples of applicable conditions are described further below. Candidate views are located by traversing down the tree. The in-memory index, called a filter tree, helps to quickly discard views that cannot be used by a query.

A filter tree is a multiway search tree in which all the leaves are on the same level. A node in the tree contains a collection of (key, pointer) pairs. A key comprises a set of values, not just a single value. A pointer in an internal node points to a node at the next level while a pointer in a leaf node points to a list of view descriptions. A filter tree recursively subdivides the set of views into smaller and smaller non-overlapping partitions. At each level, a different partitioning condition is applied.

A search in a filter tree begins at the top node and proceeds recursively down the tree. The search may traverse multiple paths. When the search reaches a node, it continues along some of the node's outgoing pointers. Whether to continue along a pointer is determined by applying a search condition on the key associated with the pointer. The condition is always of the same type: a key qualifies if it is a subset (superset) of or equal to the given search key. The search key is also a set. A linear scan can be performed to check every key of the node but this may be slow if the node contains many keys. To avoid a linear scan, the keys are organized in a lattice structure, which allows all subsets (supersets) of a given search key to be found rapidly. This internal structure of a filter tree node is referred to as a lattice index.

The following is an example of a partitioning condition that can be applied at some level of the filter tree: a query cannot be computed from a view unless the view's set of source tables is a superset of the query's set of source tables. To exploit this condition, the views are partitioned based on the set of source tables used by the view. Given a query, only those partitions are considered whose source tables is a superset of the query's source tables. All views belonging to other partitions can be discarded without further checking.

Figure 6:
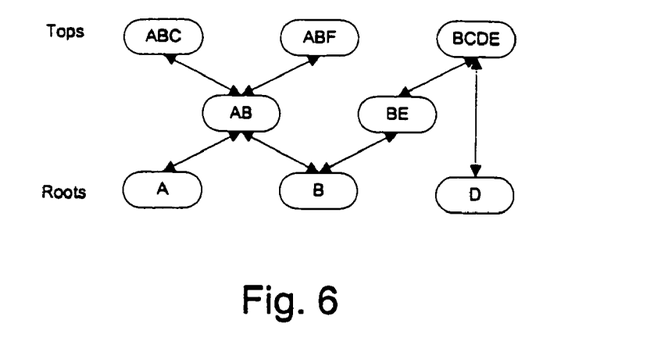
FIG. 6 shows an exemplary lattice index storing key sets in accordance with the present invention.

The conditions applied at different levels are independent and can be composed in any order to create a filter tree. For instance, a filter tree can be created in which the root node partitions the views based on their hubs and the second level nodes further subdivide each partition according to the views' extended output column lists. More levels can be added using any other partitioning conditions. Levels include, in preferred order from top to bottom: hubs, source tables, output expressions, output columns, residual constraints, and range constraints. For aggregation views, there are two additional levels: grouping expressions and grouping columns. Regarding lattice indexes, the subset relationship between sets imposes a partial order among sets, which can be represented as a lattice. As the name indicates, a lattice index organizes the keys in a graph that correspond to the lattice structure. In addition to a (key, downward pointer) pair, a node in the lattice index contains two collections of pointers, superset pointers and subset pointers that point to other lattice index nodes. A superset pointer of a node V points to a node that represents a minimal superset of the set represented by V. Similarly, a subset pointer of V points to a node that represents a maximal subset of the set represented by V. Sets with no subsets are called roots and sets without supersets are called tops. A lattice index also contains an array of pointers to tops and an array of pointers to roots. FIG. 6 shows a lattice index storing eight key sets, A, B, D, AB, BE, ABC, ABF, and BCDE.

Figure 7:
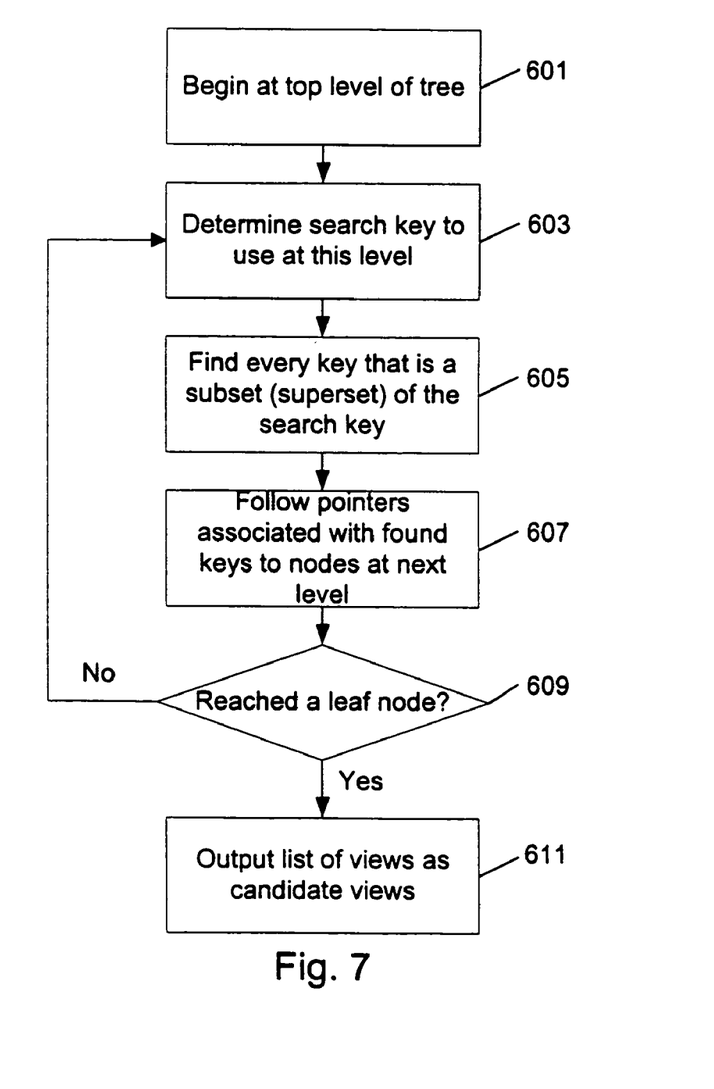
FIG. 7 is a flow diagram of an exemplary method of determining supersets of a key set in accordance with the present invention.

Searching a filter tree is a recursive procedure. FIG. 7 is a flow diagram of an exemplary method of finding supersets of a key set. At step 601, the search begins with the node at the top of the tree. At each level of the tree, the search key to use at that level is determined in step 603. At step 605, the keys within a node are searched to find those that are a subset (or superset as appropriate for the level of the node in the tree) of the search key. Each key has an associated pointer pointing to a node at the next level of the tree. At step 607, the pointers associated with qualifying keys are followed to nodes at the next level. At step 609, the reached node is inspected and if it is a leaf node, the procedure continues with step 611; otherwise it returns to step 603. Each leaf node has an associated list of views. At step 611, the views associated with a reached leaf node are output as candidate views, which are then subject to the detailed checking explained earlier.

The search within a node in step 605 preferably makes use of the lattice index embedded in the node. For example, suppose that it is desired to find supersets of AB in FIG. 6. Starting from the top nodes of the lattice index, it is determined that ABC and ABF are supersets of AB. From each qualifying lattice node, the subset pointers are recursively followed and, at each step, the target lattice node is checked to determine if its key is a subset of AB. AB is acceptable but none of its subset nodes are. The search returns ABC, ABF, and AB. Note that AB is reached twice, once from ABC and once from ABF. To avoid visiting and possibly returning the same node multiple times, the search procedure preferably remembers which nodes have been visited. The method for finding subsets is similar; one difference is that the search starts from root nodes and proceeds upwards following superset pointers.

Partitioning Conditions for Use in the Filter Tree

At each level of the tree a partitioning condition is used to partition the views into disjoint subsets. This section explains eight exemplary partitioning conditions but further such conditions are possible.

The first partitioning condition is called the source table condition. As described above, a query expression cannot be computed from a view unless the view references, at least, all the tables referenced by the query expression. This observation is the basis for the source table condition, namely, the tables referenced by the query must be a subset of the tables referenced by the view.

The second condition is called the hub condition. It is described above how to eliminate tables from a view if the tables are joined in through cardinality-preserving joins. If that procedure is continued until no further tables can be eliminated, the remaining set of tables is called the hub of the view. A view cannot be used to answer a query unless all extra tables are eliminated through cardinality-preserving joins. The hub cannot be reduced further so a view can be disregarded if its hub is not a subset of the query's set of source tables. This observation provides the hub condition, namely, a query cannot be computed from a view unless the hub of the view is a subset of the query's set of source tables.

The third condition is called the output column condition. As described above, a query cannot be computed from a view unless all its output expressions can be computed from the output of the view. However, this does not mean that a query output column has to match an output column because of equivalences among columns. As an example, suppose the query outputs columns A, B, and C. Furthermore, suppose the query contains column equality predicates generating the following equivalence classes: {A, D, E}, {B, F} {C}. The columns within an equivalence class all have the same value so they can be used interchangeably in the output list. This choice is indicated by writing the output list as {A, D, E}, {B, F} {C}.

Now consider a view that outputs {A, D, G}, {E}, {B} and {C, H} where the column equivalences have been computed from the column equality predicates of the view. The columns that are actually included in the output list are indicated by underlining. Logically, the view can then be treated as outputting all of the columns, that is, as if its output list were extended to A, D, G, E, B, C, H.

The first output column of the query can be determined from the view if at least one of the columns A, D, or E exists in the view's extended output list. In this case, all of them do. Similarly, the second output column can be determined if B or F exists in the extended output list. B does (but F does not). Finally, the third output column requires C, which also exists in the extended output list. Consequently, the query output can be computed from the view.

As the example illustrates, to test availability of output columns, column equivalences in the query and in the view should be considered. This is done by replacing each column reference in the output list by a reference to the column's equivalence class. For a view, an extended output list is determined by including every column in the referenced equivalence classes.

This observation is the basis for the output column condition; namely, a view cannot provide all required output columns unless, for each equivalence class in the query's output list, at least one of its columns is available in the view's extended output list. To efficiently exploit this condition, one preferably builds a lattice index using the extended output list as the keys of the index.

The fourth condition is called the grouping column condition. It applies only to aggregation views and queries, that is, expression involving group-by. An aggregation query cannot be computed from an aggregation view unless the query's grouping columns are a subset of the view's grouping columns, again taking into account column equivalences. This is the same relationship as the one that must hold between the output columns of the query and the view. Consequently, the views' grouping lists can be extended in the same way as for output columns and lattice indexes can be built on the extended grouping lists.

The fifth condition is called the range constraint condition. A query cannot be computed from a view that specifies range constraints on a column unless the same column is range constrained in the view, again taking into account column equivalences. Each query and view is associated with a range constraint list, where each entry references a column equivalence class. A column equivalence class is included in the list if it has a constrained range, that is, at least one of the bounds has been set. Next, an extended constraint list is computed in the same way as for output columns but this time for the query and not the view.

Note that the extended range constraint list is associated with the query, and not the view. Hence, lattice indexes on the extended constraint lists of views, mimicking the indexes on output columns and grouping columns, cannot be used. However, lattice indexes can be built based on a weaker range condition involving a reduced range constraint list. The reduced range constraint list contains only those columns that reference trivial equivalence classes, i.e., columns that are not equivalent to any other columns.

When building a lattice index, the complete constraint list of a view is included and used as the key of a node but the subset-superset relationship is determined based on the reduced constraint list. A search starts from the roots and proceeds upwards along superset edges. If a node passes the weaker range constraint condition, its superset pointers are followed but the node is returned only if it also passes the-range constraint. If a node fails the weaker range constraint condition, all of its superset nodes will also fail so there is no need to check them.

The sixth condition is called the residual predicate condition. A query cannot be computed from a view unless the view's residual predicate list is a subset of the query's residual predicate list. Regarding residual predicate conditions, recall that all predicates that are neither column-equality predicates nor range predicates are treated as residual predicates. The residual subsumption test checks that every residual predicate in the view also exists in the query, again taking into account column equivalences. An embodiment of the test uses a matching function that compares predicates converted to text strings, omitting column references, and then matches column references separately. A residual predicate list associated with each view and query contains just the text strings of the residual predicates. Then the following condition must hold: a query cannot be computed from a view unless its (textual) output expression list is a subset of the view's (textual) output expression list. This condition establishes a subset relationship that can be used for building and searching a lattice index.

The seventh condition is called the output expression condition. An output expression is an output column whose value is defined by any expression other than a simple column reference. Output expressions are handled in much the same way as residual predicates. Convert the expressions to text strings, omitting column references, and associate with each view and query an output expression list consisting of the text strings of its output expressions. For filtering purposes, lattice indexes are preferably built using the text strings of the view's output expressions as keys.

The eighth condition is called the grouping expression condition. Expressions in the grouping clause can be handled in the same way as expressions in the output list.

The systems and methods of the present invention are flexible, fast and scalable. Flexibility is provided by the column equivalences, range predicates, and hubs. Speed is crucial because the view matching algorithm may be called many times during optimization of a complex query. The present invention can be implemented in Microsoft SQL Server. Optimization time increases linearly with the number of views but remains low even up to a thousand views.

Extensions to the View Matching Procedure

The techniques described above can be extended to a broader class of views and substitute expressions. Support for predicates containing ORs can be added. Determining when a scalar expression can be computed from other scalar expressions can also be added.

The systems and methods described above produce single-table substitutes. Union substitutes and substitutes with base table back-joins can be included. Union substitutes cover the case when all rows needed are not available from a single view but can be collected from several views. Overlapping views together with SQL's bag semantics complicate the issue. If the same rows can be obtained from multiple views, it should be ensured that they appear in the result with the right duplication factor. Base table back-joins cover the case when a view contains all tables and rows needed but some columns are missing. In that case, it is desirable to back-join the view to a base table to pull in the missing columns, particularly if the missing columns are available from an index.

Multiple views may be used to evaluate a query because different views may be used for different parts of the query. No restrictions are imposed on the overall query. Regardless of the complexity of the overall query, whenever the optimizer finds a SPJ+G expression, the view matching rule is invoked. All substitutes produced by view matching participate in cost-based optimization in the normal way. Furthermore, any secondary indexes defined on a materialized view are desirably considered in the same way as for base tables. Thus, the techniques of the present invention can be extended to a broader class of input and substitute expressions, for example, expressions containing unions, self-joins, outer joins or aggregation with grouping sets.

The techniques of the present invention can also be extended to consider functional dependencies in a dimension hierarchy. If a dimension hierarchy is implemented as a set of tables connected by foreign keys, the functional dependencies are implied by foreign keys and will be exploited automatically.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A computer system comprising a processor for generating a substitute expression for a query expression comprising:
   means for receiving a query expression;
   means for receiving a plurality of materialized views;
   means for generating a candidate subset of the materialized views;
   means for determining qualifying materialized views based on the candidate subset by determining whether an equijoin subsumption test is satisfied, determining whether a range subsumption test is satisfied, and determining whether a residual subsumption test is satisfied; and
   means for generating a substitute expression for the query expression based on each qualifying materialized view.

2. The computer system of claim 1, wherein means for generating the candidate subset of materialized views comprises means for determining which of the plurality of materialized views cannot be used.

3. The computer system of claim 2, wherein means for determining which of the plurality of materialized views cannot be used comprises means for searching a filter tree having a plurality of nodes.

4. The computer system of claim 3, wherein means for searching the filter tree comprises means for recursively subdividing the materialized views into non-overlapping partitions by applying predetermined partitioning conditions.

5. The computer system of claim 4, wherein the predetermined partitioning conditions comprise at least one of source table conditions, hub conditions, output column conditions, grouping columns conditions, range constraint conditions, residual predicate conditions, output expression conditions, and grouping expression conditions.

6. The computer system of claim 1, further comprising means for storing descriptions of the plurality of materialized views in a storage memory prior to receiving the plurality of materialized views.

7. The computer system of claim 6, wherein means for storing the descriptions of the plurality of materialized views in a storage memory comprises means for storing each of the materialized views as a table.

8. The computer system of claim 1, wherein means for determining the qualifying materialized views based on the candidate subset comprises checking each materialized view of the candidate subset against at least one predetermined condition.

9. The computer system of claim 8, wherein means for checking each materialized view against at least one predetermined condition comprises means for determining whether each materialized view of the candidate subset comprises a plurality of rows needed by the query expression.

10. The computer system of claim 9, wherein means for determining whether each materialized view of the candidate subset comprises the plurality of rows needed by the query expression comprises:
   means for determining a plurality of column equivalence classes for the query expression;
   means for determining a plurality of column equivalence classes for the materialized view;

means for determining whether the equijoin subsumption test is satisfied;

means for determining a plurality of range intervals for the query expression;

means for determining a plurality of range intervals for the materialized view;

means for determining whether the range subsumption test is satisfied; and means for determining whether the residual subsumption test is satisfied.

11. The computer system of claim 8, wherein means for checking each materialized view against at least one predetermined condition comprises means for determining whether a plurality of rows needed by the query expression are extractable from the materialized view.

12. The computer system of claim 8, wherein means for checking each materialized view against at least one predetermined condition comprises means for determining whether a plurality of output expressions needed by the materialized view can be determined from the materialized view.

13. The computer system of claim 8, wherein means for checking each materialized view against at least one predetermined condition comprises means for determining a first plurality of tables referenced by the query expression, means for determining a second plurality of tables referenced by the materialized view, and means for comparing the first and second plurality of tables to determine a duplication factor.

14. A computer readable medium having stored thereon a data structure, comprising:

a first data field for receiving a query expression;

a second data field for receiving a plurality of materialized views;

a third data field for generating a candidate subset of the materialized views;

a fourth data field for determining qualifying materialized view based on the candidate subset by determining whether an equijoin subsumption test is satisfied, determining whether a range subsumption test is satisfied, and determining whether a residual subsumption test is satisfied; and a fifth data field for generating a substitute expression for the query expression based on each qualifying materialized view.

15. The computer readable medium of claim 14, having stored thereon a fifth data structure for determining which of the plurality of materialized views cannot be used when generating the candidate subset of materialized views.

16. The computer readable medium of claim 15, having stored thereon a sixth data structure for searching a filter tree having a plurality of nodes when determining which of the plurality of materialized views cannot be used.

17. The computer readable medium of claim 16, having stored thereon a seventh data structure for recursively subdividing the materialized views into non-overlapping partitions by applying predetermined partitioning conditions when searching the filter tree.

18. The computer readable medium of claim 17, wherein the predetermined partitioning conditions comprise at least one of source table conditions, hub conditions, output column conditions, grouping columns conditions, range constraint conditions, and residual predicate conditions, output expression conditions, and grouping expression conditions.

19. The computer readable medium of claim 14, having stored thereon an eighth data structure for storing descriptions of the plurality of materialized views in a storage memory prior to receiving the plurality of materialized views.

20. The computer readable medium of claim 19, having stored thereon a ninth data structure for storing each of the materialized views as a table when storing the descriptions of the plurality of materialized views in a storage memory.

21. The computer readable medium of claim 14, having stored thereon a tenth data structure for checking each materialized view of the candidate subset against at least one predetermined condition when determining the qualifying materialized views based on the candidate subset.

22. The computer readable medium of claim 21, having stored thereon an eleventh data structure for determining whether each materialized view of the candidate subset comprises a plurality of rows needed by the query expression when checking each materialized view against at least one predetermined condition.

23. The computer readable medium of claim 22, having stored thereon a twelfth data structure for:

determining a plurality of column equivalence classes for the query expression;

determining a plurality of column equivalence classes for the materialized view;

determining whether the equijoin subsumption test is satisfied;

determining a plurality of range intervals for the query expression;

determining a plurality of range intervals for the materialized view;

determining whether the range subsumption test is satisfied; and determining whether the residual subsumption test is satisfied.

24. The computer readable medium of claim 21, having stored thereon a thirteenth data structure for determining whether a plurality of rows needed by the query expression are extractable from the materialized view.

25. The computer readable medium of claim 21, having stored thereon a fourteenth data structure for determining whether a plurality of output expressions needed by the materialized view can be determined from the materialized view.

26. The computer readable medium of claim 21, having stored thereon a fifteenth data structure for determining a first plurality of tables referenced by the query expression, determining a second plurality of tables referenced by the materialized view, and comparing the first and second plurality of tables to determine a duplication factor.

* * * * *